US010728097B1

United States Patent
Chin et al.

(10) Patent No.: US 10,728,097 B1
(45) Date of Patent: Jul. 28, 2020

(54) HIERARCHICAL POLICIES IN A NETWORK

(71) Applicant: Riverbed Technology, Inc., San Francisco, CA (US)

(72) Inventors: Bill Y. Chin, Sunnyvale, CA (US); Elanchezhiyan Elango, Cupertino, CA (US); Venkatram Ramanathan, San Jose, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 68 days.

(21) Appl. No.: 16/204,144

(22) Filed: Nov. 29, 2018

Related U.S. Application Data (60) Provisional application No. 62/592,289, filed on Nov. 29, 2017.

(51) Int. Cl.
*G06F 15/16* (2006.01)
*H04L 12/24* (2006.01)
*H04L 29/08* (2006.01)

(52) U.S. Cl.
CPC .......... *H04L 41/0893* (2013.01); *H04L 67/32* (2013.01)

(58) Field of Classification Search
CPC ... H04L 29/08072; H04L 63/02; H04L 67/02; H04L 67/10
USPC ........ 709/203, 220, 224, 226, 227, 228, 232
See application file for complete search history.

(56) References Cited

U.S. PATENT DOCUMENTS

| 7,934,017 | B2 * | 4/2011 | Wilkinson | ............ H04L 63/102 709/245 |
| 8,245,129 | B2 * | 8/2012 | Wilkinson | ................ G06F 8/61 715/236 |
| 9,256,353 | B2 * | 2/2016 | Wilkinson | ............... G06F 9/468 |
| 10,181,047 | B2 * | 1/2019 | Lim | ....................... G06F 21/604 |
| 10,198,162 | B2 * | 2/2019 | Wilkinson | ............... G06F 9/468 |
| 2007/0239859 | A1 * | 10/2007 | Wilkinson | ........... H04L 61/1523 709/220 |
| 2008/0133777 | A1 * | 6/2008 | Wilkinson | ........... G06F 16/9535 709/249 |
| 2008/0147787 | A1 * | 6/2008 | Wilkinson | ................ G06F 8/65 709/203 |
| 2009/0077618 | A1 * | 3/2009 | Pearce | ................ H04L 63/0892 726/1 |
| 2016/0028776 | A1 * | 1/2016 | Lim | ....................... G06F 21/604 726/1 |

* cited by examiner

*Primary Examiner* — Khanh Q Dinh
(74) *Attorney, Agent, or Firm* — Park, Vaughan, Fleming & Dowler LLP; Laxman Sahasrabuddhe (57) ABSTRACT

Systems and techniques are described for applying a set of policy rules to network traffic. During operation, conditions specified in the set of policy rules can be evaluated, wherein each condition is a logical expression defined over a set of variables, and is evaluated by substituting values of the set of variables associated with the network traffic into the logical expression. Next, a subset of policy rules can be selected whose conditions evaluated as true. A highest precedence policy rule from the subset of policy rules can then be identified by applying a set of precedence rules to the subset of policy rules, wherein the set of precedence rules imposes a precedence order on the set of policy rules based on condition categories and condition specificities. Finally, an action that is specified in the highest precedence policy rule can be performed.

18 Claims, 5 Drawing Sheets

Application Groups

| | | | |
|---|---|---|---|
| ● Business Bulk | Subjects: | Actions: | ● |
| ● Business Critical | Subjects: | Actions: | ● |
| ● Business Productivity | Subjects: | Actions: | ● |
| ● Business Standard | Subjects: | Actions: | ● |
| ● Business VDI | Subjects: | Actions: | ● |
| ● Business Video | Subjects: | Actions: | ● |
| ● Business Voice | Subjects: | Actions: | ● |
| ● Recreational | Subjects: | Actions: | ● |
| ● Standard Bulk | Subjects: | Actions: | ● |
| ● Custom Applications | Subjects: | Actions: | ● |
| ● All Apps Default | Subjects: | Actions: | ● |

Application Groups 302

HIERARCHICAL POLICIES IN A NETWORK

RELATED APPLICATION

This application claims benefit of U.S. Provisional Patent Application No. 62/592,289, entitled "STEELCONNECT HIERARCHICAL POLICIES," by the same inventors, filed on 29 Nov. 2017, the contents of which are herein incorporated by reference in their entirety for all purposes.

BACKGROUND

This disclosure generally relates to hierarchical policies in a network. The emergence of software-defined wide-area-network (SDWAN) technology promises to simplify networking so that end-users can focus on their business critical applications, and not worry about their underlying network. Network administrators and end-users use policies to control how a network behaves for different types of traffic, applications, etc. When the number of policies or rules required to configure a network is small, it is fairly easy to just create them one by one. However, complex networks are not that simple. There will be exceptions to global policies that must be added. As the number of exceptions grows, then exceptions to the exceptions will arise when policies are not well thought out. Unfortunately, when there are 20, 50, or over 100 policy rules, it becomes very difficult for the network administer to ensure correctness of those rules, and it also becomes difficult to understand the implications of adding/deleting/modifying the policy rules. Incorrectly adding, deleting, or modifying a rule can have a potentially catastrophic impact on the network.

Therefore, what are needed are techniques and systems to provide network administrators and operators to define policies without the above-mentioned drawbacks.

SUMMARY

Embodiments described herein provide network administrators and operators a simple and intuitive policy framework while providing users the level of control they expect. Some embodiments provide techniques and systems for applying a set of policy rules to network traffic. During operation, the embodiments can evaluate conditions specified in the set of policy rules, wherein each condition is a logical expression defined over a set of variables, and is evaluated by substituting values of the set of variables associated with the network traffic into the logical expression. Next, the embodiments can select a subset of policy rules whose conditions evaluated as true. The embodiments can then select a highest precedence policy rule from the subset of policy rules by applying a set of precedence rules to the subset of policy rules, wherein the set of precedence rules imposes a precedence order on the set of policy rules based on condition categories and condition specificities. Finally, the embodiments can perform an action specified in the highest precedence policy rule.

In some embodiments, the set of variables includes one or more of a user variable that corresponds to a user, an application variable that corresponds to an application, a network segment variable that corresponds to a network segment, and a timeframe variable that corresponds to a timeframe.

In some embodiments, the action includes one or more of path selection, encryption, Quality of Service (QoS), and drop. In some embodiments, the condition categories include an application category, a user category, a segment category, and a timeframe category. In some embodiments, the precedence order in decreasing precedence is as follows: conditions in the application category, conditions in the user category, conditions in the segment category, and conditions in the timeframe category. In some embodiments, within a given category, conditions with more specificity have higher precedence than conditions with lower specificity.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following cases: (1) only X; (2) only Y; (3) only Z; (4) X and Y; (5) X and Z; (6) Y and Z; and (7) X, Y, and Z. Additionally, in this disclosure, the term "based on" means "based solely or partially on."

According to one definition, a computer is any device that is capable of performing computations. In some embodiments, a computer can include a processing mechanism that is capable of executing instructions stored on a storage medium. Examples of computers include, but are not limited to, handheld computers, laptop computers, desktop computers, distributed computers, printers, appliances, etc. According to one definition, a data communication network (or "network" for short) is an interconnection of one or more devices that is capable of delivering information from one computer to another computer. Examples of networks include, but are not limited to, wireless and wired networks, local area networks (LANs), metropolitan area networks (MANs), wide area networks (WANs), private networks, public networks, intranets, internets, etc. Data communication networks often include a variety of network devices for sending, receiving, directing, and optimizing network data traffic.

Some embodiments described herein provide intuitive hierarchy around policy constructs. A policy can be defined as a rule that matches a set of conditions, and when the set of conditions are matched, the rule takes some actions. Each condition is a logical expression that is defined over a set of variables. The set of variables include, but are not limited to, application variables that can be set to application identifiers, site variables that can be set to site identifiers, user variables that can bet set to identifiers, timeframe variables that can be set to timeframes, etc. Example of actions include, but are not limited to selecting a specific path, providing a specific quality of service (QoS), dropping a packet, etc.

At the bottom of the hierarchy are policies that have all conditions as wildcards (in general, lower hierarchy levels correspond to lower precedence, and higher hierarchy levels correspond to higher precedence). Specifying one or more conditions creates a higher hierarchy policy rule. Higher policy rules inherit the actions of their parent rules (which are lower level rules) unless the action is specifically overridden. This framework can be used to create exceptions to the rules. Note that, in this approach, the conditions have an inherent hierarchical order. By adding a clearly defined hierarchy construct, policy rules become consistent, logical, and intuitive. Even if hundreds of policy rules are created, the hierarchy framework described in this disclosure can make it fairly straightforward to understand how the network is supposed to behave under those policy rules.

Figure 1A:
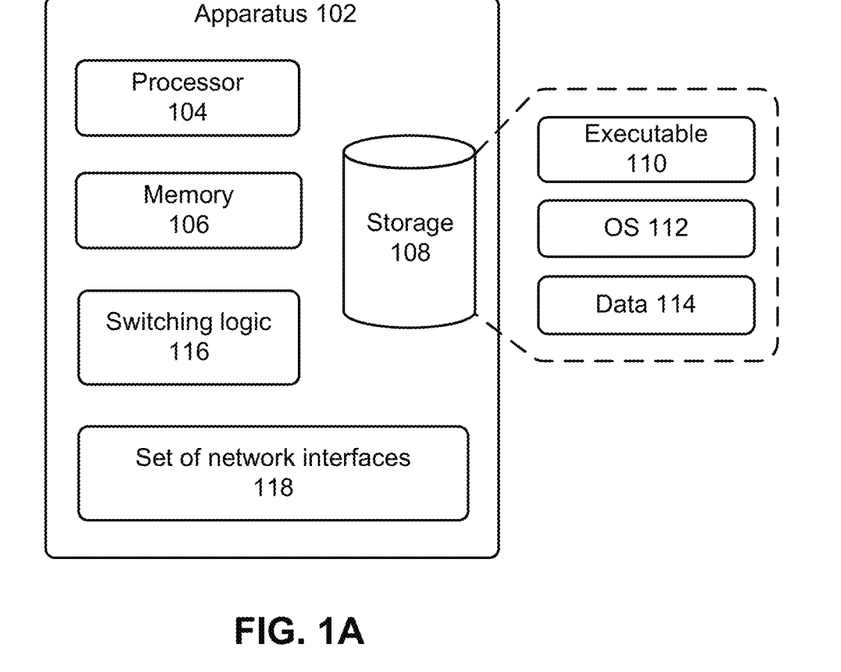
FIG. 1A illustrates an apparatus in accordance with some embodiments described herein.

FIG. 1A illustrates an apparatus in accordance with some embodiments described herein. Apparatus 102 (e.g., a computer, a web server, an application server, etc.) comprises processor 104, memory 106 (e.g., a volatile or non-volatile random access memory), and storage 108 (e.g., a flash memory device or a disk drive). Storage 108 can store executable 110, operating system 112, and data 114. The components in apparatus 102 can communicate with one another using a communication mechanism, e.g., a bus, a backplane, and/or a switching fabric. Executable 110 can include instructions that, when executed by processor 104, cause apparatus 102 to perform one or more methods that are implicitly or explicitly described in this disclosure. Data 114 can include any data that is inputted into or outputted by executable 110.

Apparatus 102 can also include switching logic 116 and set of network interfaces 118. Set of network interfaces 118 can be used to transmit data to and/or receive data from other communication devices. Switching logic 116 can forward network traffic received on one or more network interfaces in accordance with switching/forwarding/routing information stored in apparatus 102. Specifically, switching logic 116 can be configured by processor 104 in accordance with one or more methods that are implicitly or explicitly described in this disclosure.

Figure 1B:
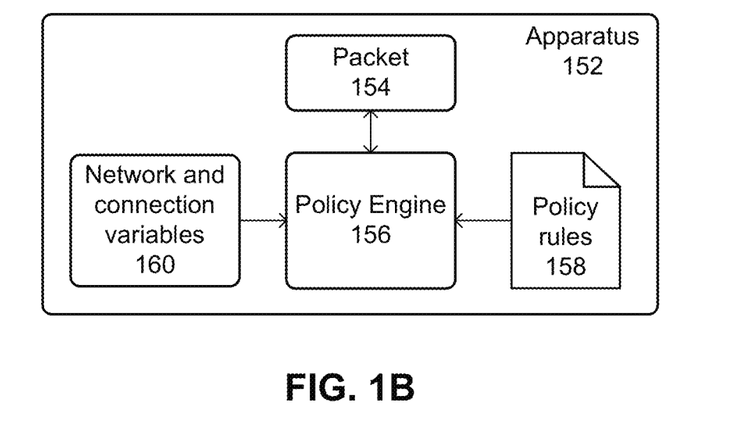
FIG. 1B illustrates a logical view of an apparatus in accordance with some embodiments described herein.

FIG. 1B illustrates a logical view of an apparatus in accordance with some embodiments described herein. Apparatus 152 can include packet 154, policy engine 156, policy rules 158, and network and connection variables 160. Policy engine 156 can be an executing process itself, or it can be a module that is invoked by an executing process at runtime. Policy rules 158 can be stored on a storage medium, e.g., storage 108 in FIG. 1A. In some embodiments, policy engine 156 can apply policy rules 158 to packet 154 to decide what action, if any, needs to be performed on packet 154. Specifically, policy engine 156 can use the information in packet 154 and network and connection variables 160 to match one or more conditions specified in policy rules 158. If the conditions for multiple rules are matched, then policy engine 156 can select the rule with the highest precedence whose condition was matched. Policy engine 156 can then perform the action specified in the selected rule.

Figure 2:
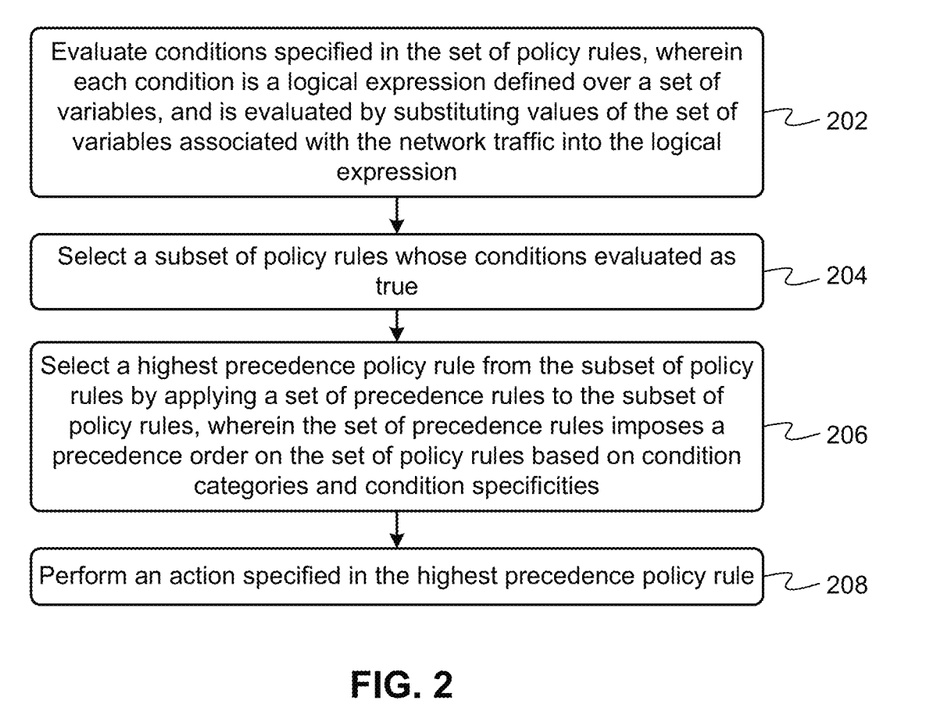
FIG. 2 illustrates a process for applying a set of policy rules to network traffic in accordance with some embodiments described herein.

FIG. 2 illustrates a process for applying a set of policy rules to network traffic in accordance with some embodiments described herein. The process can begin by evaluating conditions specified in the set of policy rules, wherein each condition is a logical expression defined over a set of variables, and is evaluated by substituting values of the set of variables associated with the network traffic into the logical expression (step 202). The set of variables can include: a user variable that corresponds to a user, an application variable that corresponds to an application, a network segment variable that corresponds to a network segment, and a timeframe variable that corresponds to a timeframe.

Next, the process can select a subset of policy rules whose conditions evaluated as true (step 204). The process can then select a highest precedence policy rule from the subset of policy rules by applying a set of precedence rules to the subset of policy rules, wherein the set of precedence rules imposes a precedence order on the set of policy rules based on condition categories and condition specificities (step 206). Each condition belongs to a condition category. Condition categories can include, but are not limited to, the following: an application category, a user category, a segment category, or a timeframe category. In some embodiments, the precedence order in decreasing precedence is as follows: conditions in the application category, conditions in the user category, conditions in the segment category, and conditions in the timeframe category. In some embodiments, within a given category, conditions with more specificity have higher precedence than conditions with lower specificity.

Finally, the process can perform an action specified in the highest precedence policy rule (step 208). The action can be path selection (i.e., route the network traffic over a particular network path), encryption (i.e., encrypt the network traffic), Quality of Service (QoS) (i.e., route the network traffic with a particular QoS level), or drop (i.e., drop packets belonging to the network traffic).

An Example of an Implementation

In one embodiment, the hierarchical policy framework uses the following entities. (1) Policy rules (or "rules" for short) are defined by the user to manage the behavior of the network. A policy rule is defined by using a policy definition language which is described below. Policy rules allow a user to express the following type of directives: "my voice traffic should go through private links." (2) Rule Configurations are predefined configurations used by the rules and are not defined as a part of the rules themselves. For instance, rules could use QoS classes, but the QoS classes themselves are not defined as a part of rules. The QoS class hierarchy and other such rule configurations are defined outside of the policy rules. (3) Profiles are a combination of rules and their related rule configurations. For example, a profile can include a rule that states that "voice traffic should use QoS class RealTime," in conjunction with a rule configuration that defines the "RealTime" QoS class. (4) Policies refers to the when a profile is applied to SiteTypes (which define a type of a network site) or specific network sites.

In some embodiments, the following grammar can be used to specify policy rules (the following grammar is specified in pseudo-EBNF):

RulesList: Rule+
Rule: Conditions→Actions
Conditions: Condition+
Condition: App|AppGroup|User|UserGroup Site|Site-Group|Segments|TimeFrames
TimeFrames: AllTheTime|BussinessHours|Weekdays|Weekends|CustomTime # Default is AllTheTime
Actions: Action+
Action: PathSelection|Encryption|QoS|Drop
PathSelection: 'PS:' DirectToInternet, UplinkTags, Having DirectToInternet: Yes|No # Default is No.
UplinkGroups: 'Uplinks-' Not? UplinkTag+#
Ordered list of uplink Groups, or Any UplinkGroupProperty: Any|Public|Private Having: 'Having-' QualityGroup, DropIfNotMet
QualityGroup: # Defines the path quality expectations. Defined outside the rules language as a part of configs.
DropIfNotMet: Yes|No # Default is No
Encryption: 'Encrypt:' Yes|No|Don't Care # Default is Don't Care.
QoS: 'QoS:' QoSProfile, QoSClass, [DSCPMark]
QoSProfile: # Defined outside of this rules language as a part of RuleConfigs.
QoSClass: Specific QoS class to use within the QoSProfile
DSCPMark: Optional DSCP mark to apply to outgoing packets.

As mentioned above, conditions define the matching criteria for the traffic, and in some embodiments there are four categories of conditions that can be specified in a rule: users, applications, network segments and timeframes. A rule can have multiple conditions that can belong to any of these categories. When a rule does not have a condition for a certain category, then it implicitly matches the default group for that category. For example, a rule that doesn't specify a particular user or user group will apply to all users.

As mentioned above, actions are different treatments that can be applied to the network traffic that matches the conditions. More than one action can be applied to a network traffic that matches the conditions in a rule. Some of the keywords in the rule grammar that was shown above are now discussed.

The keyword "PathSelection" specifies a particular path or a set of paths that the network traffic is to be routed over. The "DirectToInternet" keyword specifies whether or not the network traffic must be dropped directly onto the underlay internet; the default for this action is "no." "UplinkGroups" can be used to group uplinks. For example, this could be a pre-defined grouping that the network device defines (e.g., "Any," "Best," "Public," "Private," etc.) or it could be any custom grouping that the user defines. The terms "Public" and "Private" refer to specific uplink tags. The optional "Not" prefix can be used to prevent traffic from going through a particular uplink tag. For example, the "Not" prefix can be used if a user wanted to keep certain types of traffic off a particular type of network. The "QualityGroup" keyword can be used to define the path quality expectations in terms of latency, jitter, packet loss, MOS, etc. As explained above, this is defined outside the rules language as a part of rule configurations. For example, a "QualityGroup" named "HighQualityVoice" may be defined as "Latency <20 ms and MOS >3.75." The "DropIfNotMet" keyword can be used to define whether the packet is dropped if the path quality expectations are not met; the default is 'No'. An example of a rule is as follows: "Voice Traffic→(PS: Uplinks—Private, Having—HighQualityVoice)."

The "Encryption" keyword specifies whether the selected traffic must be encrypted, not encrypted, or don't care. This may affect which uplink can be used. For example, if the policy is set to encrypt, then the traffic cannot go out on uplinks that do not have an encrypted tunnel. An example of a rule is as follows: "Voice Traffic→(Encrypt: Don't Care)."

The "QoS" keyword specifies the predefined QoS profile class that needs to be applied to the selected traffic. For example, consider the rule "Voice Traffic→(QoS: Internet, RealTime)."

As explained above, the ordering of the rules is determined by the precedence of conditions. In some embodiments, among conditions of different category, the precedence (highest to lowest) is as follows: (1) applications, (2) users, (3) network segments, and (4) timeframes. The point of having these precedence rules is to have some enforced precedence among the conditions. For example, the rule R1 "Outlook→PS: Uplinks—Best, Having—LowLatencyGroup" has higher precedence than rule R2 "CEO→PS: Uplinks—Private" because the condition in rule R1 belongs to the application category, whereas the condition in rule R2 belongs to the user category.

If a network administrator needs to override the generic outlook rule for the CEO (i.e., rule R2), then the administrator can add a specific (Outlook, CEO) rule R3 as follows: "(Outlook, CEO)→PS: Uplinks—Private." The conditions for rules R1 and R3 belong to the same category, namely, the application category. Therefore, the precedence order between these two rules will be decided based on the specificity.

Within conditions of the same category, a rule with a more specific matching criteria gets higher precedence than one with a less specific matching criteria. For example, the rule R4 "Facebook→(PS: Uplinks—Public), (QoS: MPLS, LowPriority)" has higher precedence than the rule R5 "SocialAppGroup, (PS: Uplinks—Public)." Both R4 and R5 belong to the application category. However, rule R4 is specific to a particular member (i.e., "Facebook") in "SocialAppGroup" which can include multiple social network applications. For timeframes, a narrower time frame takes higher precedence than a broader timeframe. For example, a rule that applies only to the weekend has higher precedence than a rule that applies all the time. The following table shows a set of rules that have been ordered from highest precedence to lowest precedence based on applying the precedence rules to the conditions of the rules Each condition in the table has three terms that belong to three different condition categories, and are separated by commas. The first term specifies an application condition and belongs to the application category, the second term specifies a user condition and belongs to the user category, and the third term specifies a timeframe condition and belongs to the timeframe category. The segment category is not used in this example. Also, note that this sequence of condition terms—i.e., application, user, timeframe—is consistent with the precedence order that was mentioned above.

For example, the condition "Outlook, CEO, AllTheTime" is satisfied whenever the network traffic originates from the CEO using the Outlook application. In other words, this condition evaluates to true if (1) the application variable associated with the network traffic is equal to "Outlook," and (2) the user variable associated with the network traffic is equal to "CEO." The asterisk is used as a wildcard symbol ("AllTheTime" is essentially a wildcard symbol for the time condition, so both "*" and "AllTheTime" mean the same thing in the following table). The last row in the table is the default policy (which is the policy at the lowest hierarchy) and matches all network traffic because it has a wild card in each of the three condition categories.

| Conditions | Actions |
| --- | --- |
| Outlook, CEO, AllTheTime | PS: Uplinks - Public |
| Outlook, *, Weekends | PS: Uplinks - MPLS1 |
| Outlook, *, AllTheTime | PS: Uplinks - MPLS2 |
| BusinessApps | <Some Action> |

-continued

| Conditions | Actions |
|---|---|
| (includes Outlook), *, AllTheTime | |
| *, CEO, AllTheTime | PS: Uplinks - Private |
| *, *, * | <default policy> |

The following table shows how the rule language implementation described in this disclosure can be used to implement policies in the network. The following table is provided for implementation purposes only and is not intended to limit the scope of the disclosure.

| No. | Intent | Policy | Comments |
|---|---|---|---|
| 1. | I want my email traffic on MPLS Only. | Email -> PS: Uplinks - Private | |
| 2. | I want to keep YouTube traffic off of MPLS | Youtube -> (PS: Uplinks-Public, DropIfNotMet=Yes) | |
| 3. | I want my voice traffic on MPLS if available, otherwise any other link is OK. | Voice -> (PS: Uplinks - MPLS) | |
| 4. | I want my voice traffic on a link with <20 ms latency, otherwise block it | Voice -> (PS: Uplinks - Any, Having - LowLatencyGroup) | |
| 5. | I want my voice traffic on the link with the lowest jitter | Voice -> (PS: Uplinks - Any, Having - BestJitterGroup) | BestJitterGroup is a user-defined QualityGroup that takes care of representing lowest jitter. |
| 6. | I want to block YouTube traffic | Youtube -> Drop | |
| 7. | I want branch sites to send Internet traffic direct to the Internet | InternetBound -> (PS: DirectToInternet=Yes, Uplinks - Public) | InternetBound is an AppGroup of all internet-bound traffic. |

Terms such as "QoSProfile," "QualityGroup," etc. are rule configurations that are defined elsewhere and are referenced by the rules. As mentioned above, a list of policy rules with any related rule configurations forms a profile. In some embodiments, a profile can inherit from another profile. This inheritance feature can be very useful in the use case when a profile is being created to accommodate one or more exceptions to an existing profile. Specifically, a network administrator can define a new profile that inherits from an existing profile, and define the exception rules in the new profile. In this manner, the new exception profile will override the older profile in only those instances where the exception rules and any accompanying rule configurations are triggered. The remaining rules and any accompanying rule configurations that did not change from the base profile are automatically inherited into the exception profile. This feature ensures that multiple copies of the same rules or rule configurations are not maintained in different profiles, thereby improving the overall correctness of the system. (This is because whenever multiple copies of an entity are maintained, inconsistencies can crop up between the multiple copies. Profile inheritance prevents such inconsistencies from cropping up.)

Figure 3A:
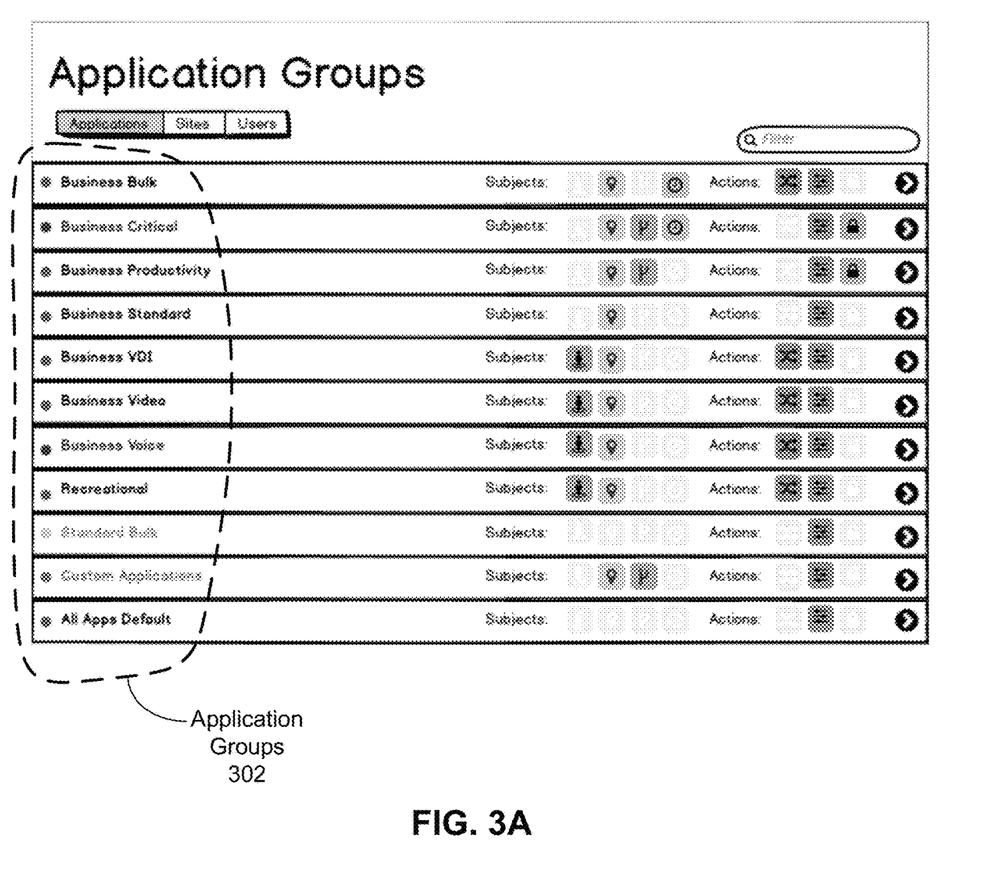
FIGS. 3A-3C illustrate a graphical user interface (GUI) for managing policy rules in accordance with some embodiments described herein.
Figure 3B:
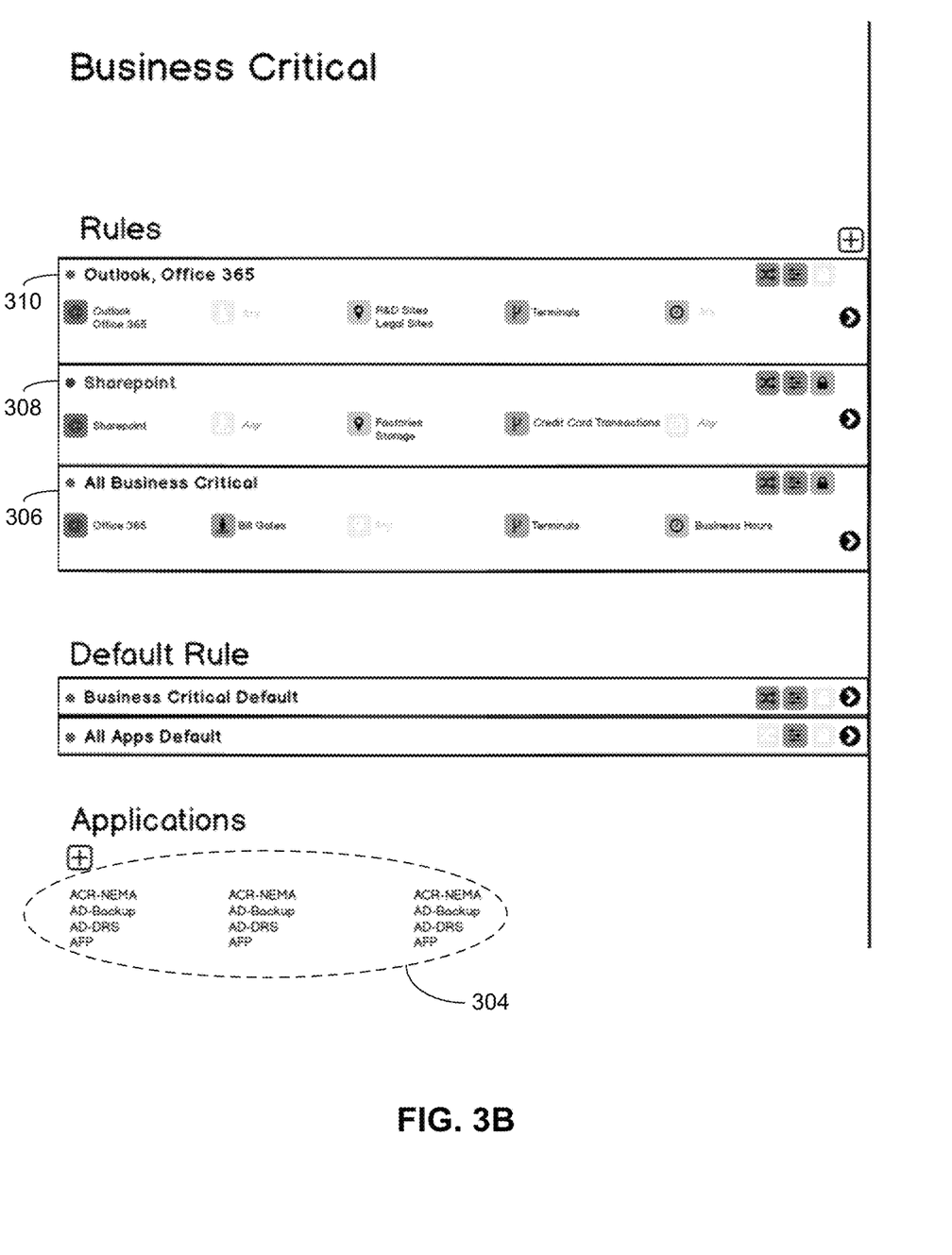
Figure 3C:
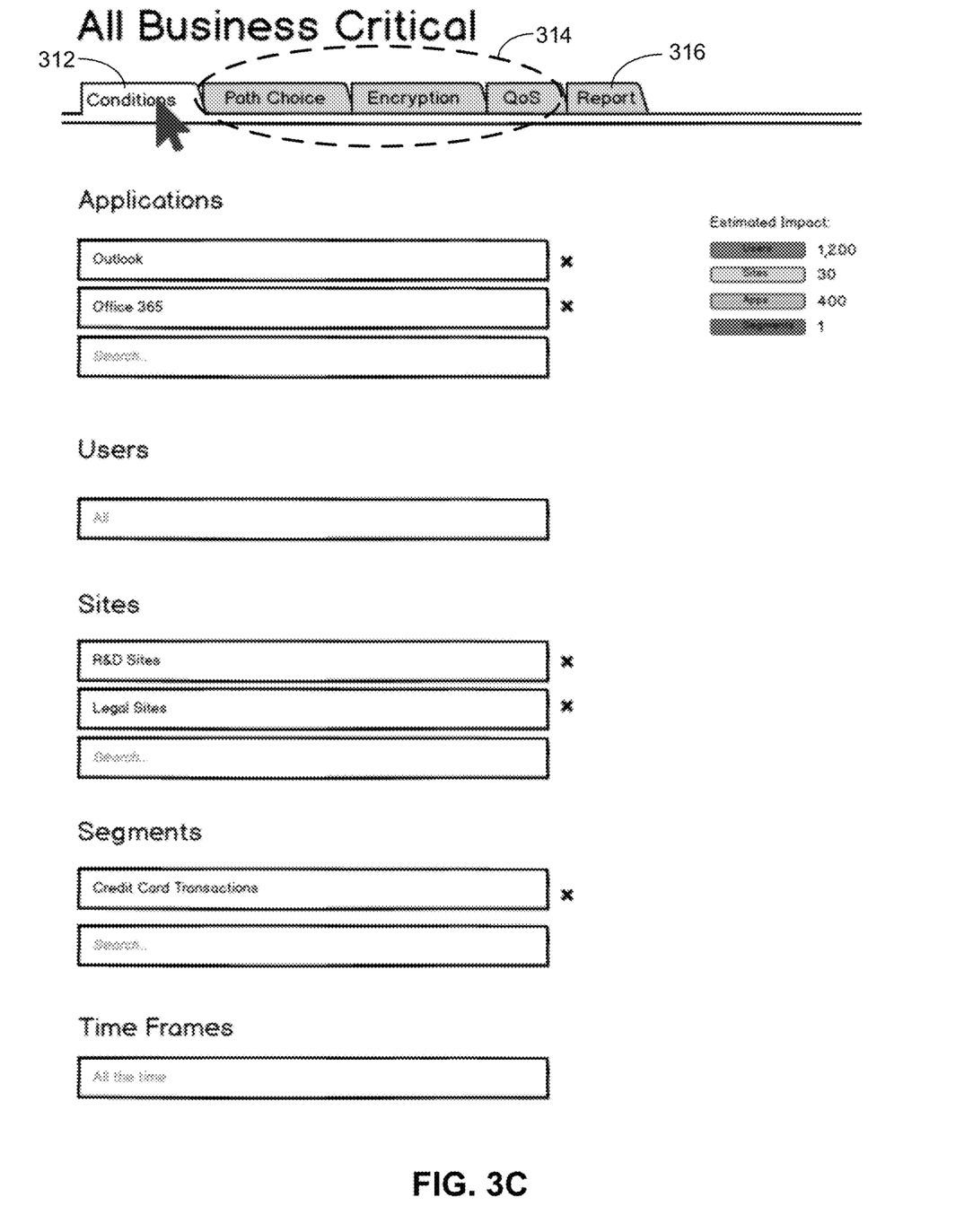

FIGS. 3A-3C illustrate a graphical user interface (GUI) for managing policy rules in accordance with some embodiments described herein. FIG. 3A illustrates a set of application groups 302 for which rules can be defined. FIG. 3B illustrates rules for the application group called "Business Critical." The list of applications 304 that belong to the "Business Critical" application group are shown at the bottom of the GUI view in FIG. 3B. Three rules—306, 308, and 310—are also shown in the GUI view. Rule 306 is the base rule that is applied to all applications that belong to the "Business Critical" application group. Rules 308 and 310 are more specific, and therefore have higher precedence than rule 306. Rule 308 is specific to network traffic for the application "Sharepoint" and rule 310 is specific to network traffic for applications "Outlook" and "Office 365." FIG. 3C illustrates a GUI view for specifying a rule. In particular, FIG. 3C illustrates rule 306 that is applied to all "Business Critical" network traffic. As can be seen from FIG. 3C, the GUI view provides tab 312 for entering and viewing the conditions, tabs 314 for entering and viewing different types of actions, and tab 316 for viewing a report of any rules that were triggered and any actions that were taken.

The data structures and code described in this disclosure can be partially or fully stored on a non-transitory computer-readable storage medium and/or a hardware module and/or hardware apparatus. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for applying a set of policy rules to network traffic, the method comprising:
   evaluating, by using a processor, conditions specified in the set of policy rules, wherein each condition is a logical expression defined over a set of variables, and is evaluated by substituting values of the set of variables associated with the network traffic into the logical expression;
   selecting a subset of policy rules whose conditions evaluated as true;
   selecting a highest precedence policy rule from the subset of policy rules by applying a set of precedence rules to the subset of policy rules, wherein the set of precedence rules imposes a precedence order on the set of policy rules based on condition categories and condition specificities; and performing an action specified in the highest precedence policy rule.

2. The method of claim 1, wherein the set of variables includes one or more of: a user variable that corresponds to a user, an application variable that corresponds to an application, a network segment variable that corresponds to a network segment, or a timeframe variable that corresponds to a timeframe.

3. The method of claim 1, wherein the action includes one or more of: path selection, encryption, Quality of Service (QoS), and drop.

4. The method of claim 1, wherein each condition belongs to a condition category that is one of: an application category, a user category, a segment category, or a timeframe category.

5. The method of claim 4, wherein the precedence order in decreasing precedence is as follows: conditions in the application category, conditions in the user category, conditions in the segment category, and conditions in the timeframe category.

6. The method of claim 5, wherein within a given category, conditions with more specificity have higher precedence than conditions with lower specificity.

7. A non-transitory storage medium storing instructions that, when executed by a processor, cause the processor to perform a method for applying a set of policy rules to network traffic, the method comprising:

evaluating conditions specified in the set of policy rules, wherein each condition is a logical expression defined over a set of variables, and is evaluated by substituting values of the set of variables associated with the network traffic into the logical expression;

selecting a subset of policy rules whose conditions evaluated as true;

selecting a highest precedence policy rule from the subset of policy rules by applying a set of precedence rules to the subset of policy rules, wherein the set of precedence rules imposes a precedence order on the set of policy rules based on condition categories and condition specificities; and performing an action specified in the highest precedence policy rule.

8. The non-transitory storage medium of claim 7, wherein the set of variables includes one or more of: a user variable that corresponds to a user, an application variable that corresponds to an application, a network segment variable that corresponds to a network segment, or a timeframe variable that corresponds to a timeframe.

9. The non-transitory storage medium of claim 7, wherein the action includes one or more of: path selection, encryption, Quality of Service (QoS), and drop.

10. The non-transitory storage medium of claim 7, wherein each condition belongs to a condition category that is one of: an application category, a user category, a segment category, or a timeframe category.

11. The non-transitory storage medium of claim 10, wherein the precedence order in decreasing precedence is as follows: conditions in the application category, conditions in the user category, conditions in the segment category, and conditions in the timeframe category.

12. The non-transitory storage medium of claim 11, wherein within a given category, conditions with more specificity have higher precedence than conditions with lower specificity.

13. An apparatus, comprising:
a processor; and
a non-transitory storage medium storing instructions that, when executed by the processor, cause the processor to perform a method for applying a set of policy rules to network traffic, the method comprising:

evaluating conditions specified in the set of policy rules, wherein each condition is a logical expression defined over a set of variables, and is evaluated by substituting values of the set of variables associated with the network traffic into the logical expression;

selecting a subset of policy rules whose conditions evaluated as true;

selecting a highest precedence policy rule from the subset of policy rules by applying a set of precedence rules to the subset of policy rules, wherein the set of precedence rules imposes a precedence order on the set of policy rules based on condition categories and condition specificities; and performing an action specified in the highest precedence policy rule.

14. The apparatus of claim 13, wherein the set of variables includes one or more of: a user variable that corresponds to a user, an application variable that corresponds to an application, a network segment variable that corresponds to a network segment, or a timeframe variable that corresponds to a timeframe.

15. The apparatus of claim 13, wherein the action includes one or more of: path selection, encryption, Quality of Service (QoS), and drop.

16. The apparatus of claim 13, wherein each condition belongs to a condition category that is one of: an application category, a user category, a segment category, or a timeframe category.

17. The apparatus of claim 16, wherein the precedence order in decreasing precedence is as follows: conditions in the application category, conditions in the user category, conditions in the segment category, and conditions in the timeframe category.

18. The apparatus of claim 17, wherein within a given category, conditions with more specificity have higher precedence than conditions with lower specificity.

* * * * *